United States Patent
Hwang

(10) Patent No.: US 10,649,929 B2
(45) Date of Patent: May 12, 2020

(54) MEMORY TIME-SHARING METHOD AND APPARATUS CAPABLE OF DISTRIBUTING BUS TRAFFIC OF SYSTEM-ON-CHIP

(71) Applicant: FCI INC., Gyeonggi-do (KR)

(72) Inventor: Chang-Ik Hwang, Gyeonggi-Do (KR)

(73) Assignee: Dialog Semiconductar Korea Inc., Seoul (KR)

( * ) Notice: Subject to any disclaimer, the term of this patent is extended or adjusted under 35 U.S.C. 154(b) by 22 days.

(21) Appl. No.: 15/645,299

(22) Filed: Jul. 10, 2017

(65) Prior Publication Data

US 2019/0012281 A1    Jan. 10, 2019

(51) Int. Cl.
*G06F 13/16* (2006.01)
*G06F 1/10* (2006.01)
*G06F 12/06* (2006.01)

(52) U.S. Cl.
CPC ............ *G06F 13/1689* (2013.01); *G06F 1/10* (2013.01); *G06F 12/063* (2013.01)

(58) Field of Classification Search
CPC ....... G06F 1/10; G06F 13/1689; G06F 12/063
See application file for complete search history.

(56) References Cited

U.S. PATENT DOCUMENTS

| | | | |
|---|---|---|---|
| 6,442,137 B1* | 8/2002 | Yu | H04L 49/351 370/229 |
| 7,711,907 B1* | 5/2010 | Baxter | G06F 13/1694 710/243 |
| 9,286,257 B2* | 3/2016 | Hofmann | G06F 1/06 |
| 2008/0072006 A1* | 3/2008 | Seo | G06F 13/1689 711/167 |
| 2012/0159024 A1* | 6/2012 | Morita | G06F 13/4243 710/110 |
| 2013/0031284 A1* | 1/2013 | Yun | G06F 1/3237 710/105 |
| 2015/0236870 A1* | 8/2015 | Lee | G06F 13/1689 370/257 |
| 2017/0031416 A1* | 2/2017 | Birke | G06F 1/324 |
| 2017/0139851 A1* | 5/2017 | Pean | G06F 13/102 |

* cited by examiner

*Primary Examiner* — Nimesh G Patel
(74) *Attorney, Agent, or Firm* — Saile Ackerman LLC; Stephen B. Ackerman

(57) ABSTRACT

A bus system is proposed, which includes M (M is a natural number) master ports, N (N is a natural number) slave ports, a bus, A (A is a natural number) masters, B (B is a natural number) salves, and an internal memory. The bus system includes P (P is a natural number, P≤M) master ports, a traffic monitoring unit, Q (Q is a natural number, Q≤N) slaves, a port traffic monitoring unit, and a memory clock scaling unit. Accordingly, in a system-on-chip using a low-power processor, a memory clock of an internal memory connected to a plurality of slave ports is scaled so as to distribute bus traffic.

25 Claims, 15 Drawing Sheets

MEMORY TIME-SHARING METHOD AND APPARATUS CAPABLE OF DISTRIBUTING BUS TRAFFIC OF SYSTEM-ON-CHIP

BACKGROUND

1. Technical Field

The present disclosure relates to a technology of distributing bus traffic of a system-on-chip using a low-power processor.

2. Description of the Related Art

The information disclosed in this section is only for understanding the background of the invention and therefore it may contain information that does not form the prior art.

A system-on-chip (SoC) is formed by embodying various functional components as one chip. The SoC includes a digital circuit. The digital circuit uses 0 (low) or 1 (high) indicating a logical value that is embodied by generating an electrical pulse. In addition, various components may have different processing speeds. In order to appropriately operate the digital circuit, electrical pulses of various components need to be synchronized. To this end, a generating period of a clock pulse or a clock frequency is used. Each component is operated based on each clock frequency. In addition, an operation of each component is synchronized according to one clock frequency.

FIG. 1 is a schematic block diagram of a general bus system of a SoC. Various components are broadly classified into a master and a slave. Referring to FIG. 1, the bus system may include a master 110, a slave 120, an arbiter 130, and a decoder 140.

The master 110 may be a device that transmits a control signal, an address, data, and so on to the slave 120 and permits the slave 120 to perform an operation such as read and write. The slave 120 may be a device that has an address area and performs read, write, etc. on the address area. The slave 120 may transmit a signal indicating a state of the slave 120 to the master 110. To this end, the master 110 may recognize the state of the slave 120. Then, the master 110 may command the slave 120 to perform a next operation.

The arbiter 130 may be a device that selects one master 110 among a plurality of masters 110. This is because two or more masters are not capable of simultaneously reading or writing in one slave. Accordingly, priority of an order in which two or more masters access one slave needs to be determined.

The decoder 140 is a device that selects an appropriate slave 120 using an address signal received from the master 110. In order to select a slave, the decoder 140 may use the received address. The address may be configured with bits. An address may be determined using some bits.

A path for transmitting a control signal, an address, data, or the like between the master 110 and the slave 120 is needed. A bus functions as the path.

FIG. 2 is a block diagram illustrating a master, a slave, and a bus of a SoC.

As illustrated in FIG. 2, a general bus system of a SoC may include a plurality of masters and a plurality of slaves. The bus system includes a plurality of master ports 230 to 233, a plurality of slave ports 240 to 243, a bus 205 for connection therebetween, a plurality of masters 210 to 213 connected to the plurality of master ports, respectively, and a plurality of slaves 220 to 223 connected to the plurality of slave ports, respectively.

The bus 205 is operated based on a bus clock frequency. In general, the bus clock frequency is set as one master clock frequency. For example, a bus clock may be set as a reference of a clock of a CPU.

The main reason for degrading performance of a product with a CPU embedded therein is the bottleneck phenomenon of bus traffic. In particular, the bottleneck phenomenon of bus traffic mainly occurs in a memory controller for access to a main memory.

To overcome this, a method of enhancing a bus clock frequency and a method of expanding a bus bandwidth is used. In the method of enhancing the bus clock frequency, a problem occurs in that power consumption of an entire system is increased. This is because that power consumption is proportional to frequency. A SoC mainly uses a low-power processor and, in this regard, power consumption is inevitably increased when a bus clock is matched with a CPU clock. The method of expanding a bus bandwidth has a limit in terms of hardware design and configuration.

SUMMARY

It is an object of the present disclosure to provide a method and apparatus for time-sharing of an internal memory for distributing bus traffic by scaling a memory clock of the internal memory connected to a plurality of slave ports on a system-on-chip using a low-power processor.

Objects of the present disclosure are not limited to the above-described objects and other objects and advantages can be appreciated by those skilled in the art from the following descriptions. Further, it will be easily appreciated that the objects and advantages of the present disclosure can be practiced by means recited in the appended claims and a combination thereof.

In accordance with one aspect of the present disclosure, a bus system includes a bus with master ports and N slave ports connected thereto where M is a natural number and N is a natural number, A masters connected to the M master ports, respectively where A is a natural number, B slaves connected to the N slave ports, respectively, where B is a natural number, and an internal memory controller connected to C slave ports that are selected according to predetermined priority among the N slave ports, where C is a natural number and C≤N, wherein the A masters command the B slaves to perform a predetermined operation, the B slaves perform an operation according to commands issued by the A masters, the bus transmits each of the commands issued by the A masters to the B slaves based on a bus clock, and the internal memory writes data based on a memory clock.

The above exemplary embodiments of the bus system may include one or more of the following features.

The bus may be configured in such a way that the M master ports as a horizontal axis and the N slave ports as a vertical axis are connected in a matrix form.

The bus system may further include a port traffic monitoring unit connected to P mater ports that are selected according to predetermined priority among the M master ports, connected Q slave ports that are selected according to predetermined priority among the N slave ports, and configured to monitor at least one port among the M master ports and the Q slave ports, where P is a natural number, P≤M, Q is a natural number, and Q≤N.

The bus system may further include a memory clock scaling unit connected to the internal memory and configured to scale a memory clock of the internal memory.

In accordance with one aspect of the present disclosure, a memory time-sharing apparatus includes a bus with M master ports and N slave ports connected thereto where M is a natural number and N is a natural number, A masters connected to the M master ports, respectively, where A is a natural number, B slaves connected to the N slave ports, respectively, where B is a natural number, and an internal memory controller connected to C slave ports that are selected according to predetermined priority among the N slave ports, where C is a natural number, and C≤N, a multiplexer connected to the internal memory controller, and a memory unit connected to the multiplexer and configured to write data, wherein the A masters command the B slaves to perform a predetermined operation, the B slaves perform an operation according to commands issued by the A masters, the bus transmits each of the commands issued by the A masters to the B slaves based on a bus clock, the internal memory controller controls the commands issued by the A masters according to an order based on a memory clock, and the multiplexer selects one slave port according to predetermined priority among C slave ports connected to the internal memory controller using a multiplexer selection signal, the multiplexer selection signal being operated based on a selection signal clock.

The above exemplary embodiments of the memory time-sharing apparatus may include one or more of the following features.

The internal memory controller may include C separate address areas and the C address areas and the C slave ports are connected, respectively.

In accordance with one aspect of the present disclosure, a memory time-sharing apparatus includes a bus with M master ports and N slave ports connected thereto where M is a natural number and N is a natural number, A masters connected to the M master ports, respectively, where A is a natural number, B slaves connected to the N slave ports, respectively, where B is a natural number, an internal memory controller connected to C slave ports that are selected according to predetermined priority among the N slave ports, where C is a natural number and C≤N, C multiplexers connected to the internal memory controller and D slave ports for time-sharing among the N slave ports, where D is a natural number and C+D≤N, and C memory units connected to the C multiplexers, respectively and to configured to write data, wherein the A masters command the B slaves to perform a predetermined operation, the B slaves perform an operation according to commands issued by the A masters, the bus transmits each of the commands issued by the A masters to the B slaves based on a bus clock, the internal memory controller controls the commands issued by the A masters according to an order based on a memory clock, and the C multiplexers select one slave port according to predetermined priority among the C slave ports connected to the internal memory controllers using each multiplexer selection signal, the multiplexer selection signal being operated based on a selection signal clock.

The above exemplary embodiments of the memory time-sharing apparatus may include one or more of the following features.

The internal memory controller may include a plurality of separate address areas, the plurality of address areas have address areas pointing the A masters, and each of the address areas pointing the A maters has an address area pointing the C slaves.

The internal memory controller may include C separate address areas, and the C address areas may be connected to the C slave ports, respectively, one of the C address areas and the D slave ports for time-sharing are connected to an input of one of the C multiplexers, and outputs of the C multiplexers may be connected to the C memory units, respectively.

In accordance with one aspect of the present disclosure, a memory time-sharing method for distributing bus traffic by a bus system including a bus for connection of M master ports and N slave ports and a memory connected to C slave ports among the N slave ports, where M is a natural number, N is a natural number, C is a natural number, and C≤N, the method includes setting a bus clock for operating the bus and a memory clock for operating the memory, selecting E slave ports among the C slave ports, where E is a natural number, and E≤C, scaling the memory clock according to the E slave ports, and activating the E slave ports.

DETAILED DESCRIPTION

Reference will now be made in detail to the exemplary embodiments of the present disclosure with reference to the accompanying drawings. The same reference numbers will be used throughout this specification to refer to the same parts. In the following description of the present disclosure, a detailed description of known functions and configurations herein will be omitted when it may make the subject matter of the present disclosure unclear.

It will be understood that, although the terms first, second, A, B, (a), (b), etc. may be used herein to describe various elements of the present disclosure, these terms are only used to distinguish one element from another element and essential, order, or sequence of corresponding elements are not limited by these terms. The term "comprises", "includes", or "has" described herein should be interpreted not to exclude other elements but to further include such other elements since the corresponding elements may be included unless mentioned otherwise. Further, the terms such as "unit", "module", etc. disclosed in the specification mean units for processing at least one function or operation, which may be implemented by hardware, software, or a combination thereof.

The detailed description, which will be given below with reference to the accompanying drawings, is intended to explain exemplary embodiments of the present disclosure, rather than to show the only embodiments that may be implemented according to the invention.

Figure 1:
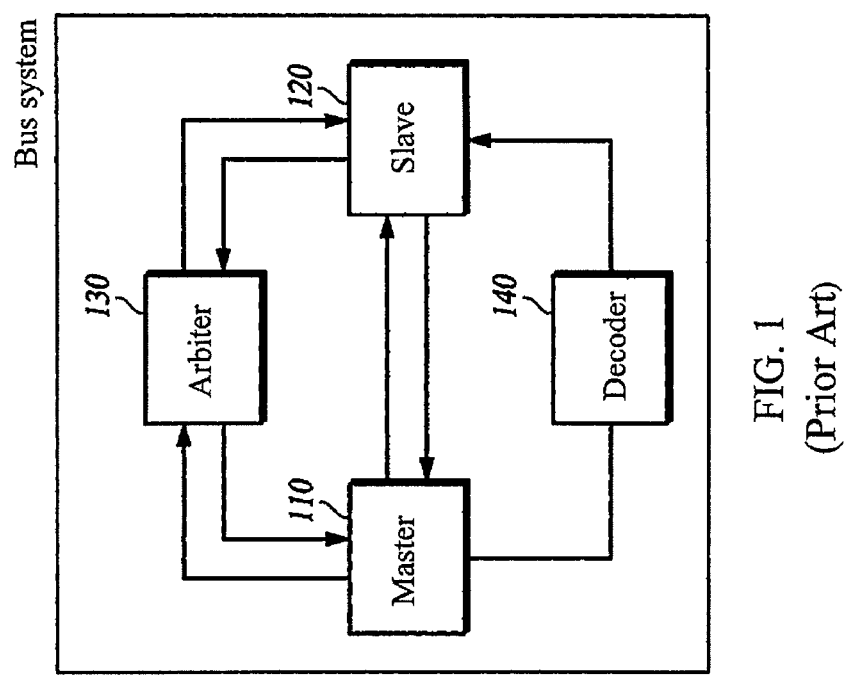
FIG. 1 is a schematic block diagram of a general bus system of a system-on-chip (SoC).
Figure 2:
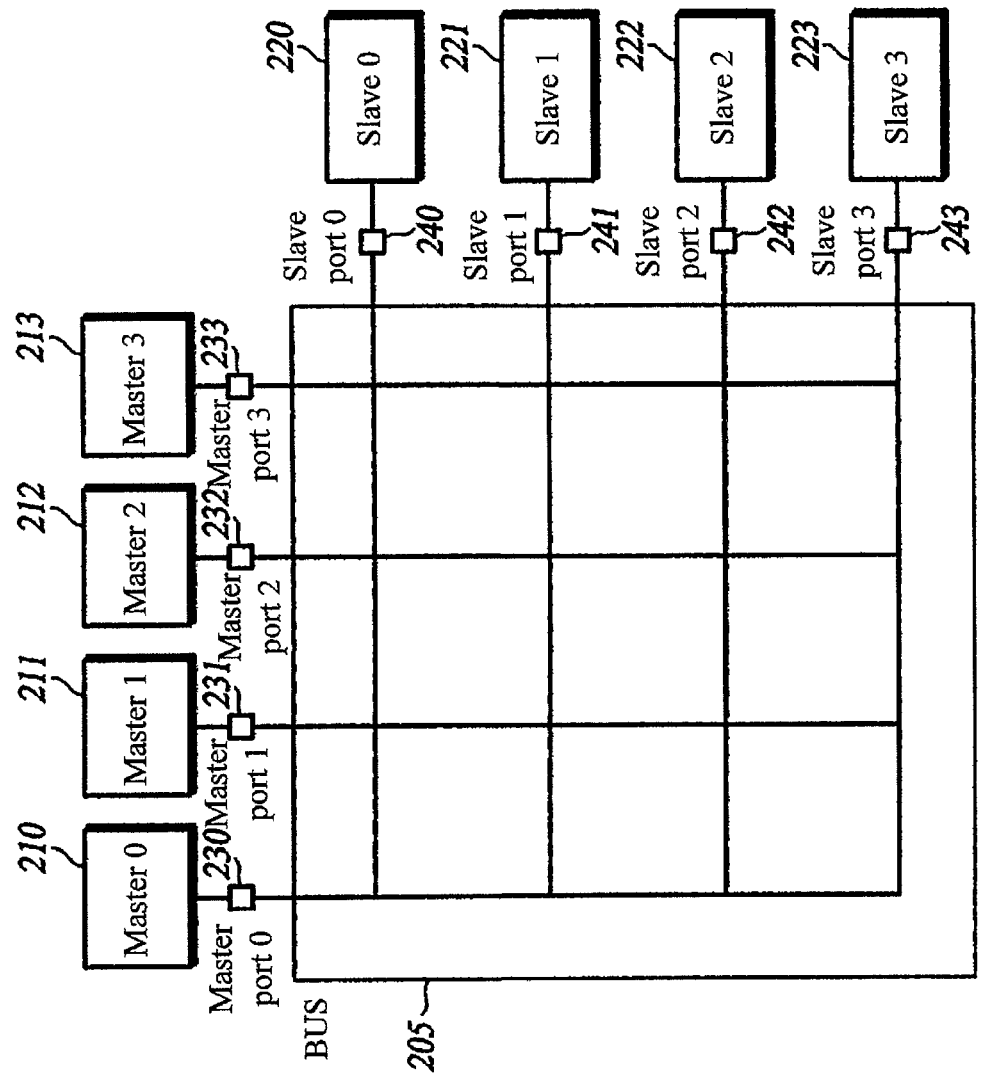
FIG. 2 is a block diagram illustrating a master, a slave, and a bus of a SoC in conventional skills.
Figure 3:
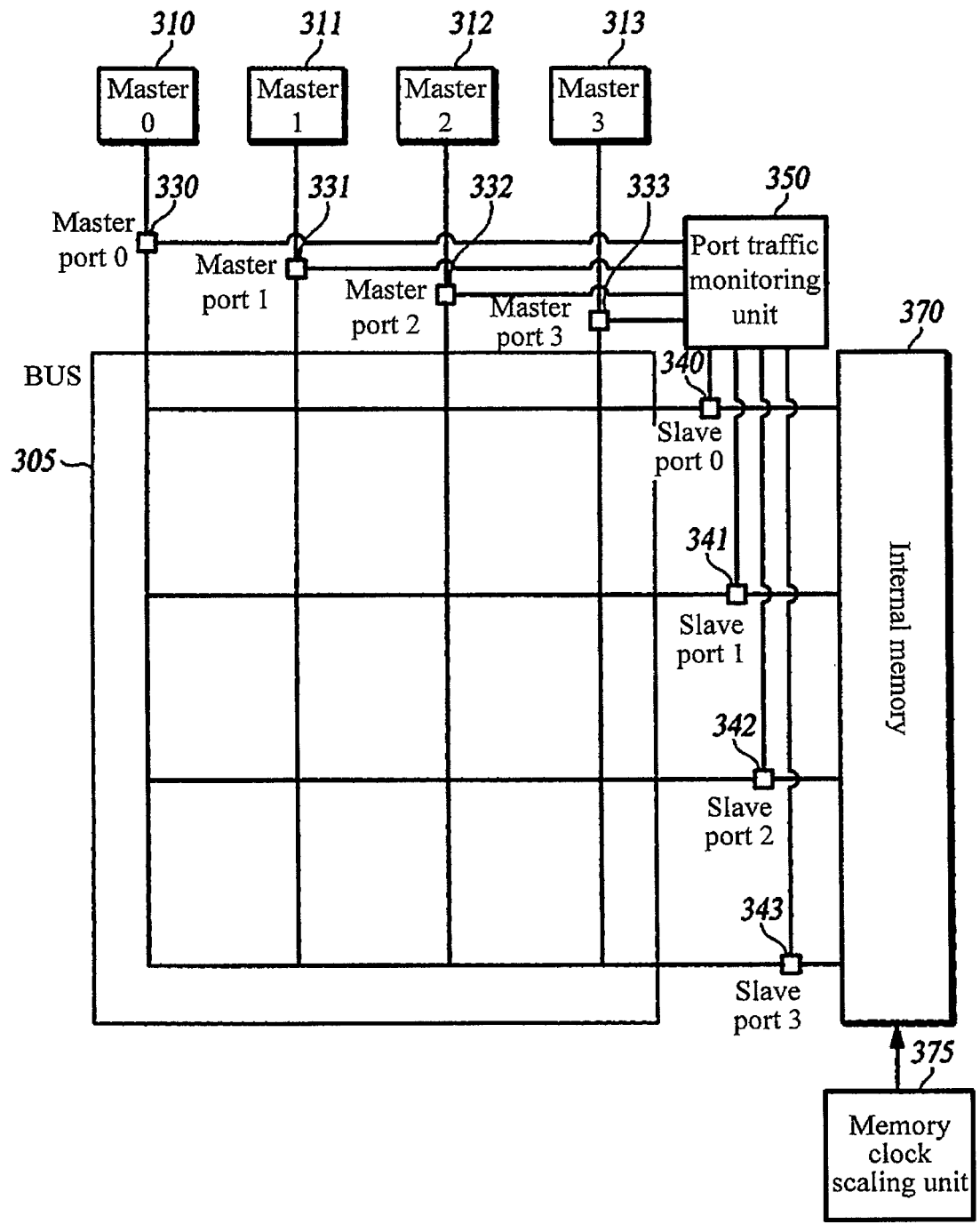
FIG. 3 is a block diagram illustrating a master, a slave, and a bus of a SoC according to the present disclosure.

With reference to FIG. 3, a bus system according to an exemplary embodiment of the present disclosure will be described. FIG. 3 is a block diagram illustrating a bus system according to an exemplary embodiment of the present disclosure.

In the present embodiment, the bus system may include M (M is a natural number) master ports, N (N is a natural number) slave ports, a bus 305, A (A is a natural number) masters, B (B is a natural number) slaves, and an internal memory 370. In the present embodiment, the bus system may include a port traffic monitoring unit 350. Components included in the bus system according to the present embodiment are not limited thereto.

For convenience of description, a bus system including four master ports, four slave ports, four masters, and four slaves will be exemplified. Referring to FIG. 3, there are a master 0 310, a master 1 311, a master 2 312, and a master 3 313, there are a slave 0 320, a slave 1 321, a slave 2 322, and a slave 3 323, there are a master port 0 330, a master port 1 331, a master port 2 332, and a master port 3 333, and there are a slave port 0 340, a slave port 1 341, a slave port 2 342, and a slave port 3 343.

As illustrated in FIG. 3, the master 0 310 may be connected to the master port 0 330, the master 1 311 may be connected to the master port 1 331, the master 2 312 may be connected to the master port 2 332, and the master 3 313 may be connected to the master port 3 333. As necessary, one master and a plurality of master ports may be connected and a plurality of masters and one master port may be connected.

The slave 0 320 may be connected to the slave port 0 340, the slave 1 321 may be connected to the slave port 1 341, the slave 2 322 may be connected to the slave port 2 342, and the slave 3 323 may be connected to the slave port 3 343. As necessary, one slave and a plurality of slave ports may be connected and a plurality of slaves and one slave port may be connected.

The master port 0 330 may be connected to the slave port 0 340, connected to the slave port 1 341, connected to the slave port 2 342, and connected to the slave port 3 343. Similarly, each of the master port 1 331, the master port 2 332, and the master port 3 333 may be connected to the slave port 0 340, connected to the slave port 1 341, connected to the slave port 2 342, and connected to the slave port 3 343. That is, the bus 305 may connect M master ports and N slave ports.

The bus 305 may operate based on a bus clock frequency and, in general, may be set with one master clock frequency. When a main master is a CPU, the bus may be set based on a clock of a CPU. A bus interface related to a bus may be variously defined according to each embodiment. A representative bus interface may be an advanced microcontroller bus architecture (AMBA) that is reclassified into an advanced high performance bus (AHB), an advanced system bus (ASB), and an advanced peripheral bus (APB).

The internal memory 370 may be connected to C (C is a natural number, C≤N) slave ports that are selected among N slave ports according to the predetermined priority. The priority as a reference for selection of a slave port may be determined according to a priority policy. The priority may be set based on a statistical value according to hardware specification.

The reference for selection of a slave port will now be further described. The slave port may be selected based on a critical path. The critical path refers to a path corresponding to a longest time period taken for a master to transmit a command and data for permitting a slave to perform an operation. A plurality of masters has different critical paths and, thus, the slave port may be selected using a critical path. For example, the master 0 310 having a longest critical path may be connected to the slave port 0 340.

The internal memory 370 may be selectively connected to the slave ports 0 to 3. For example, the internal memory 370 may be connected to the slave port 0 340, connected to the slave port 1 341, connected to the slave port 2 342, and connected to the slave port 3 343. The internal memory 370 may be connected to a plurality of slave ports.

The internal memory 370 may operate based on a memory clock. The internal memory 370 may be various types of memories according to embodiments. For example, the internal memory 370 may use a static random access memory (SRAM).

A port traffic monitoring unit 350 may be connected to P (P is a natural number, P≤M) mater ports that are selected according to predetermined priority among M master ports and may be connected Q (Q is a natural number, Q≤N) slave ports that are selected according to predetermined priority among N slave ports. The port traffic monitoring unit may monitor traffic of at least one port among P master ports and Q slave ports. The port traffic monitoring unit may monitor traffic of at least one port among P master ports and Q slave ports using at least one of the weighting and number of command signals.

For convenience of description, four master ports and four slave ports will be exemplified. Referring to FIG. 3, when the port traffic monitoring unit 350 selects four master ports among the four master ports and selects four slave ports among the four slave ports, the port traffic monitoring unit 350 may be connected to the master port 0 330, connected to the master port 1 331, connected to the master port 2 332, connected to the master port 3 333, connected to the slave port 0 340, connected to the slave port 1 341, connected to the slave port 2 342, and connected to the slave port 3 343. The port traffic monitoring unit may monitor at least one of the weighting and number of command signals that are transmitted in four master ports and four slave ports.

A memory clock scaling unit 375 may be connected to the internal memory 370 and may scale a memory clock of the internal memory 370. The memory clock of the internal memory 370 may be set to S (S is a natural number) times a bus clock by the memory clock scaling unit 375. A range in which a memory clock is scaled may be determined according to the number of slave ports. For example, when the internal memory 370 and two slave ports are connected, the memory clock of the internal memory 370 may be one or two times of the bus clock, when the internal memory 370 and three slave ports are connected, the memory clock of the internal memory 370 may be any one of one to three times of the bus clock, and when the internal memory 370 and four slave ports are connected, the memory clock of the internal memory 370 may be any one of one to four times of the bus clock.

Memory clock scaling will be described in terms of an example of an AHB interface. The AHB interface may permit a control signal, an address, and data to be shared in the same line. In addition, the AHB interface is capable of performing BURST transmission. Here, BURST transmission is a method of transmitting an address and then continuously transmitting data. BURST transmission is different from a general method of transmitting an address, transmitting data, re-transmitting an address, and transmitting data.

The AHB interface may provide communication between two buses with different operating speeds or bandwidths. In this case, a BUSY signal may be usefully used among HTRANS signals of the AHB interface. Here, the BUSY signal indicates a state in which a master takes a rest because is not capable of transmitting data during BURST transmission. When the BUSY signal is used, even if clock frequencies are different, a design with minimized circuit change may be possible.

In detail, when there is no BUSY signal, a data storage space needs to be formed every period in which a clock frequency is changed and, thus, it may be disadvantageous in terms of circuit design. When the BUSY signal is used, a spatial problem in circuit design between buses with different clocks may be overcome. A bus that operates with a relatively low clock transmits data in a burst transmission mode in a low clock period. A bus that operates with a relatively rapid clock transmits data in a rapid clock period and indicates a BUSY state in the remaining clock period according to a clock difference.

A memory clock may be scaled to distribute bus traffic in a plurality of slave ports. When a memory clock of an internal memory is scaled, a bus clock frequency is not increased and, thus, increase in power consumption may be minimized. Since a system-on-chip mainly uses a low power processor, this method is advantageous in terms of power management.

Whether or not a memory clock of the internal memory 370 is scaled by the memory clock scaling unit 375 may be determined according to traffic of a port monitored by the port traffic monitoring unit 350.

The port traffic monitoring unit 350 may monitor the weighting or number of command signals transmitted in a port. The AHB signal may be started from a prefix 'H' and may be, for example, HCLK, HRESETn, HADDR, HTRANS, HWRITE, HSIZE, HBURST, HPROT, HWDATA, HSELx, HRDATA, HREADY, HRESP, or the like. Here, x may be a signal output from an x module. For example, a signal from a master 0 is represented by 0.

The port traffic monitoring unit 350 may select any one of P master ports and Q slave ports that are connected to the port traffic monitoring unit 350 using a multiplexer (not shown).

The port traffic monitoring unit 350 may monitor the weighting value or number of command signals transmitted in at least one monitored port and compare the weighting value or number of command signals with a preset value. The preset value that is a comparison target is a statistical value according to a hardware specification. For example, the preset value may be an average, a maximum value, a minimum value, or the like. According to a priority policy, when the weighting value or number of command signals is equal to or greater than the preset value, whether a memory clock is scaled may be determined.

Thus, the memory clock may be variably scaled. Accordingly, the number of slave ports connected to a memory may be variably changed. Without unnecessary clock scaling, it may be possible to scale a clock to a minimum.

Figure 4:
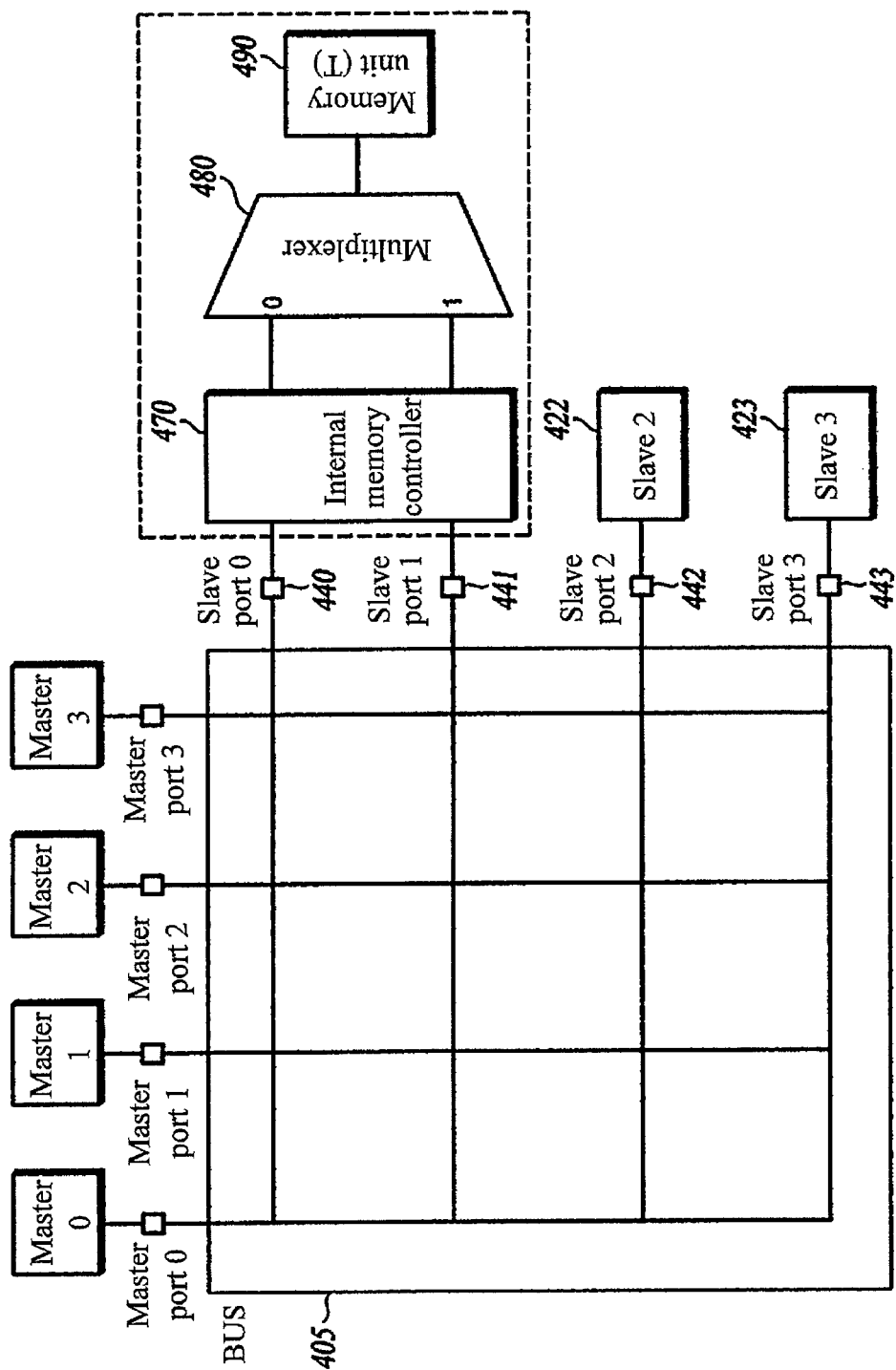
FIGS. 4 and 5 are block diagrams of examples of a memory time-sharing apparatus including a multiplexer according to other exemplary embodiments of the present disclosure.
Figure 5:
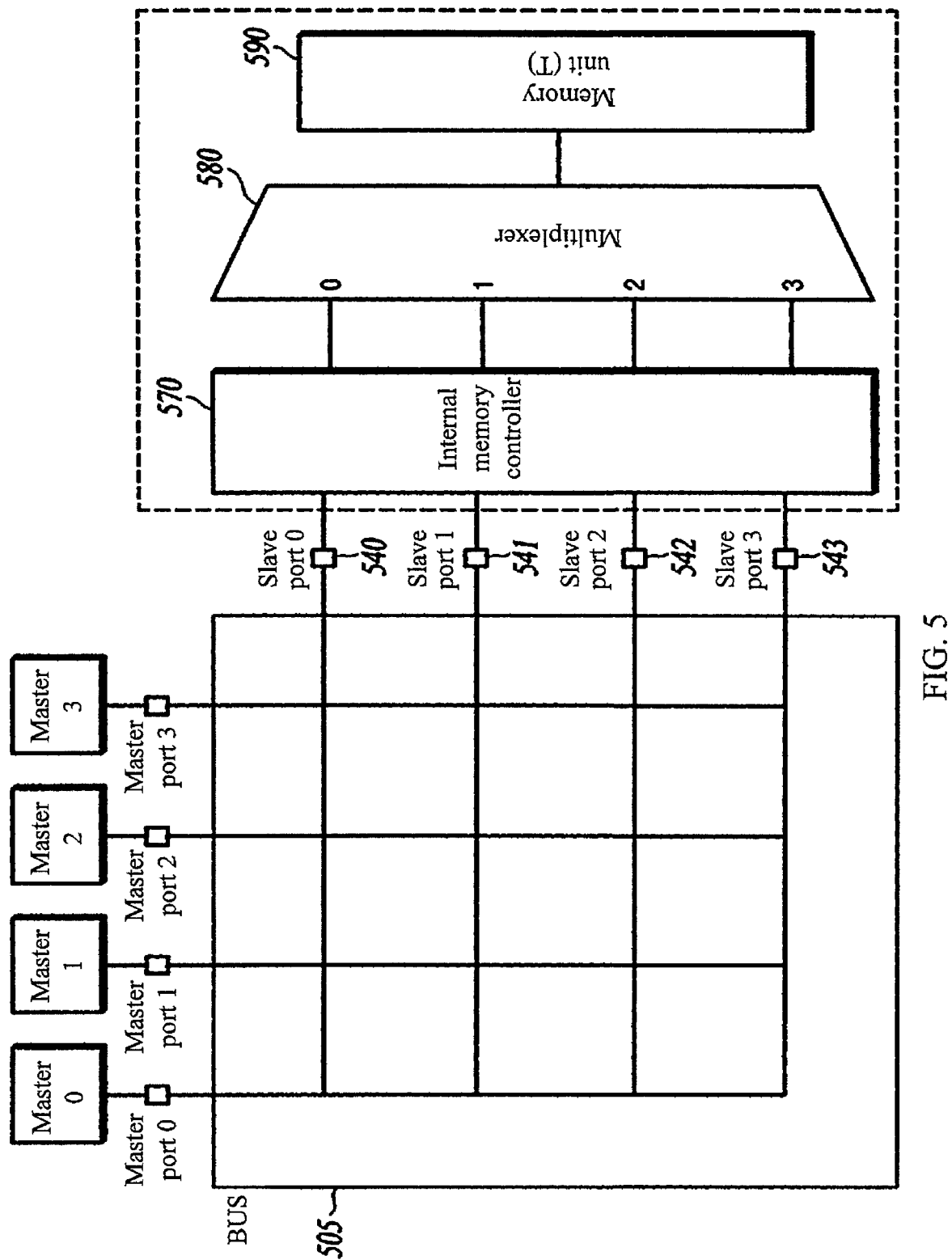

With reference to FIGS. 4 and 5, memory time-sharing apparatus according to other exemplary embodiments of the present disclosure will be described below. FIGS. 4 and 5 are block diagrams of examples of a memory time-sharing apparatus including a multiplexer according to other exemplary embodiments of the present disclosure.

In the present embodiment, the memory time-sharing apparatus may include M (M is a natural number) master ports, N (N is a natural number) slave ports, a bus 405 or 505, A (A is a natural number) masters, B (B is a natural number) slaves, an internal memory controller 470 or 570, a multiplexer 480 or 580, and a memory unit 490 or 590.

Components included in the memory time-sharing apparatus according to the present embodiment are not limited thereto.

In order to clearly describe other exemplary embodiments of the present disclosure, a repeated description of the aforementioned embodiment of the present disclosure will be omitted here.

Each of the internal memory controller 470 and 570 may be connected to C (C is a natural number, C≤N) slave ports that are selected among N slave ports according to the predetermined priority. Each of the internal memory controllers 470 and 570 may have separate address areas and connect the separate address area to C slave ports. An address may be configured with bits. For example, the address may be configured with 8 bits, 16 bits, 32 bits, or the like. In order to separate the address area, some of bits indicating an address may be used.

The multiplexers 480 and 580 may select one of plurality of inputs to output the selected input. Each of the multiplexers 480 and 580 may be connected to an internal memory controller and operated based on a multiplexer selection signal. Each of the multiplexers 480 and 580 may select one slave port with relatively high priority among C slave ports connected to the internal memory controller. The priority as a reference for selection of a slave port may be determined according to a priority policy. The priority may be set based on a statistical value according to hardware specification. When one slave port is selected, the slave port is selected based on a critical path. For example, a master 0 410 with a longest critical path may be connected to a slave port 0 440.

A plurality of masters has different critical paths. Here, the critical path refers to a path corresponding to a longest time period taken for a master to transmit a command and data for permitting a slave to perform an operation. Via memory time-sharing, a time path may be reduced depending on the situations in consideration of different critical paths. Accordingly, change in circuit may be minimized and bus traffic distribution may be maximized.

The memory units 490 and 590 may each be a memory device that is capable of reading or writing data and may be connected to the multiplexers 480 and 580, respectively. Each of the memory units 490 and 590 has a total of T bytes.

For convenience of description, the case in which four slave ports are present and the number of slave ports connected to the internal memory controller 470 is 2 will be exemplified below. With reference to FIG. 4, the internal memory controller 470 may be connected to two slave ports that are selected among four slave ports according to the predetermined priority. The internal memory controller 470 may be connected to an input of a multiplexer and the memory unit 490 may be connected to an output of the multiplexer 480. A multiplexer selection signal of the multiplexer 480 is operated based on a selection signal clock.

The selection signal clock is the same as a bus clock. A memory clock of the internal memory controller 470 is twice the bus clock.

For convenience of description, the case in which four slave ports are present and the number of slave ports connected to the internal memory controller 570 is 4 will be exemplified below. With reference to FIG. 5, the internal memory controller 570 may be connected to four slave ports. The internal memory controller 570 may be connected to an input of the multiplexer 580 and the memory unit 590 may be connected to an output of the multiplexer. A multiplexer selection signal of the multiplexer 580 is operated based on a selection signal clock. The selection signal clock is twice a bus clock. A memory clock of the internal memory controller 570 is four times the bus clock.

Figure 6:
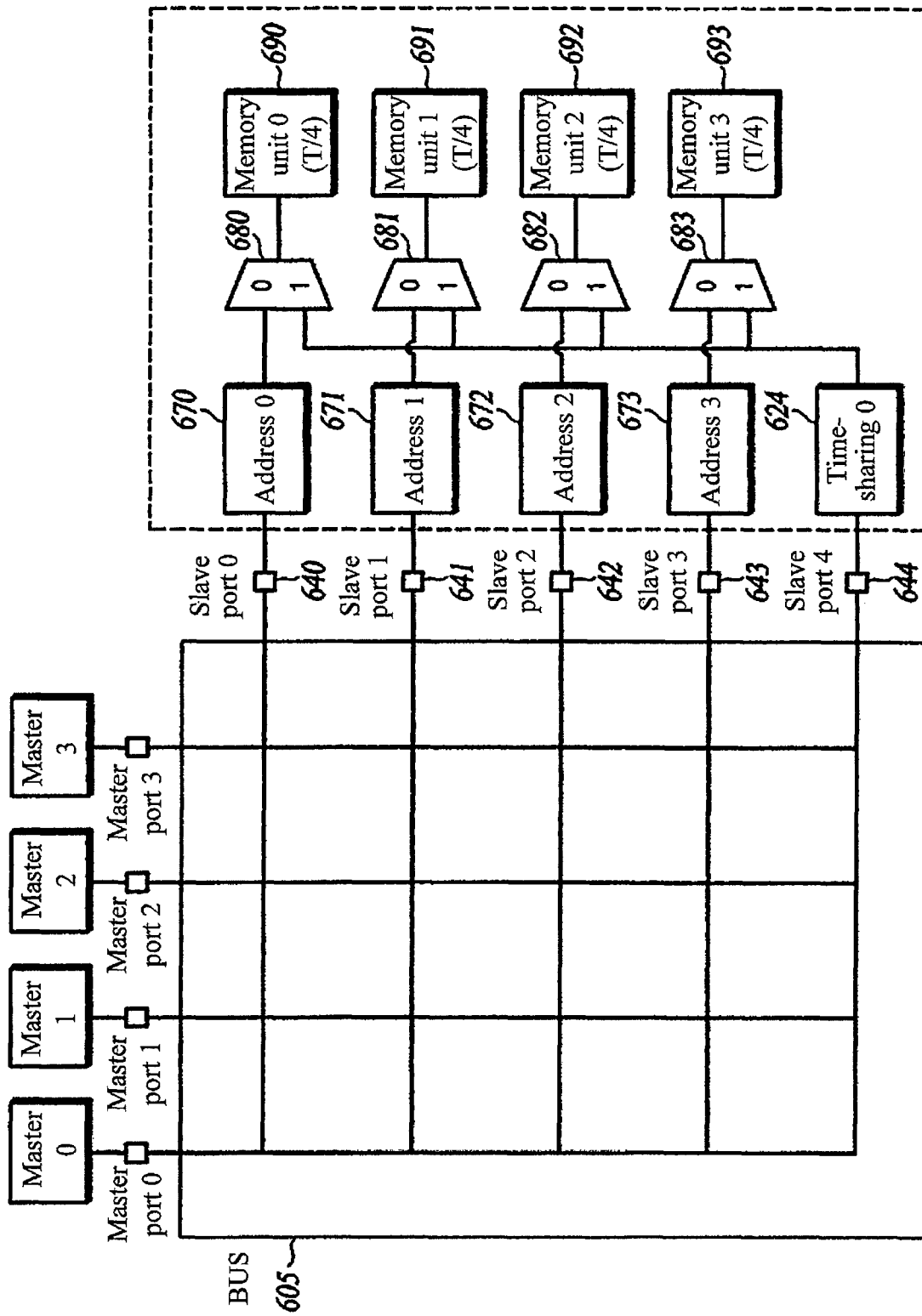
FIGS. 6 and 7 are block diagrams illustrating a memory time-sharing apparatus including a plurality of multiplexers according to other exemplary embodiments of the present disclosure.
Figure 7:
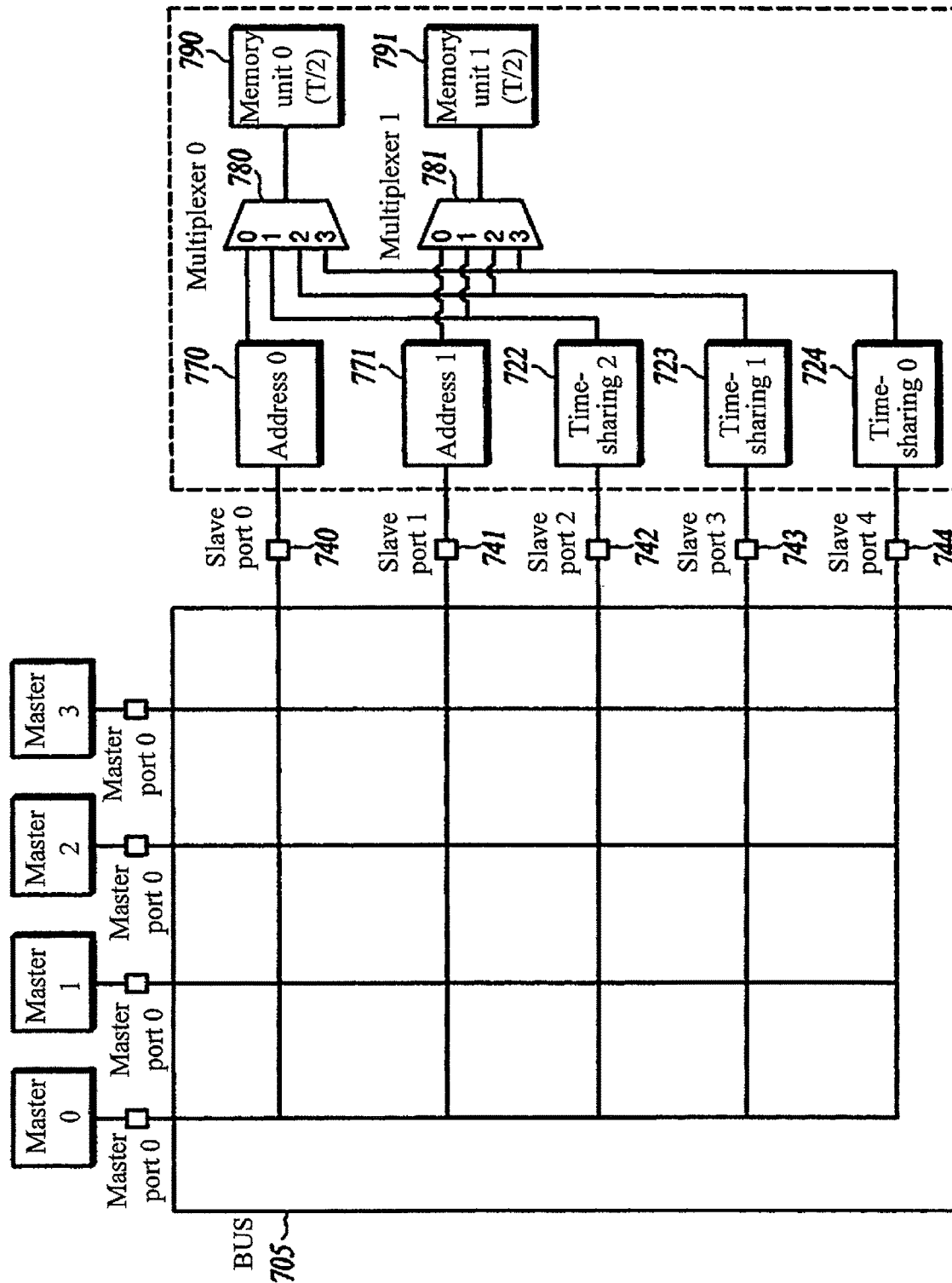

With reference to FIGS. 6 and 7, memory time-sharing apparatuses according to other exemplary embodiments of the present disclosure will be described below. FIGS. 6 and 7 are block diagrams illustrating a memory time-sharing apparatus including a plurality of multiplexers according to other exemplary embodiments of the present disclosure. The memory time-sharing apparatus may apply C (C is a natural number)-way interleaved method. Here, the interleaved refers to a method of separating a memory device into simultaneously accessible portions to remarkably reduce transmission time of data.

In the present embodiment, the memory time-sharing apparatus may include M (M is a natural number) master ports, N (N is a natural number) slave ports, buses 605, 705, or 805, A (A is a natural number) masters, B (B is a natural number) slaves, an internal memory controller (not shown), C multiplexers, and C memory units. Components included in the memory time-sharing apparatus according to the present embodiment are not limited thereto.

In order to clearly describe other exemplary embodiments of the present disclosure, a repeated description of the aforementioned embodiments of the present disclosure will be omitted here.

The internal memory controller is operated based on a memory clock. The internal memory controller include C separate address areas. The C address areas are connected to C slave ports, respectively. One address area of the C address areas and D slave ports for time-sharing may be connected to an input of one multiplexer among C multiplexers. Outputs of the C multiplexers may be connected to C memory units, respectively. An address is configured with bits. For example, the address may be configured with 8 bits, 16 bits, 32 bits, or the like. The C address areas may be separated using some of bits included in an address. The C memory units have a total of T bytes and each of the C memory units has T/C bytes.

The C multiplexers may select a slave port according to priority among B slave ports connected to an internal memory controller. The C multiplexers may select a slave port based on the critical path among B slave ports connected to the internal memory controller.

For convenience of description, the case in which four slave ports that are selected according to the predetermined priority among N slave ports will be exemplified below. There are four multiplexers that are connected to an internal memory controller and one slave port for time-sharing among N slave ports and operated based on a multiplexer selection signal. The internal memory controller may include four separate address areas.

Referring to FIG. 6, the four address areas may be connected to four slave ports that are selected based on the predetermined priority. One of the four address areas and one slave port for time-sharing may be connected to an input of one of the four multiplexers and outputs of the four multiplexers may be connected to four memory units, respectively. The four memory units have a total of T bytes and each of the four memory units may have T/4 bytes.

In this case, the multiplexer selection signal may be operated based on the selection signal clock and the selection signal clock may be the same as a bus clock. In addition, the memory clock may be twice the bus clock.

For convenience of description, the case in which two slave ports that are selected according to the predetermined priority among N slave ports will be exemplified below. There are two multiplexers that are connected to an internal memory controller and three slave ports for time-sharing among N slave ports and operated based on a multiplexer selection signal. The internal memory controller may include two separate address areas.

Referring to FIG. 7, the two address areas may be connected to two slave ports that are selected based on the predetermined priority. One of the two address areas and three slave port for time-sharing may be connected to an input to one of the two time-sharing may be connected to an input to one of the two multiplexers and outputs of the two multiplexers may be connected to two memory units, respectively. The two memory units have a total of T bytes and each of the two memory units may have T/2 bytes.

In this case, the multiplexer selection signal may be operated based on the selection signal clock and the selection signal clock may be twice a bus clock. In this case, the multiplexer selection signal may be operated based on the selection signal clock and the selection signal clock may be four times the bus clock.

Figure 8A:
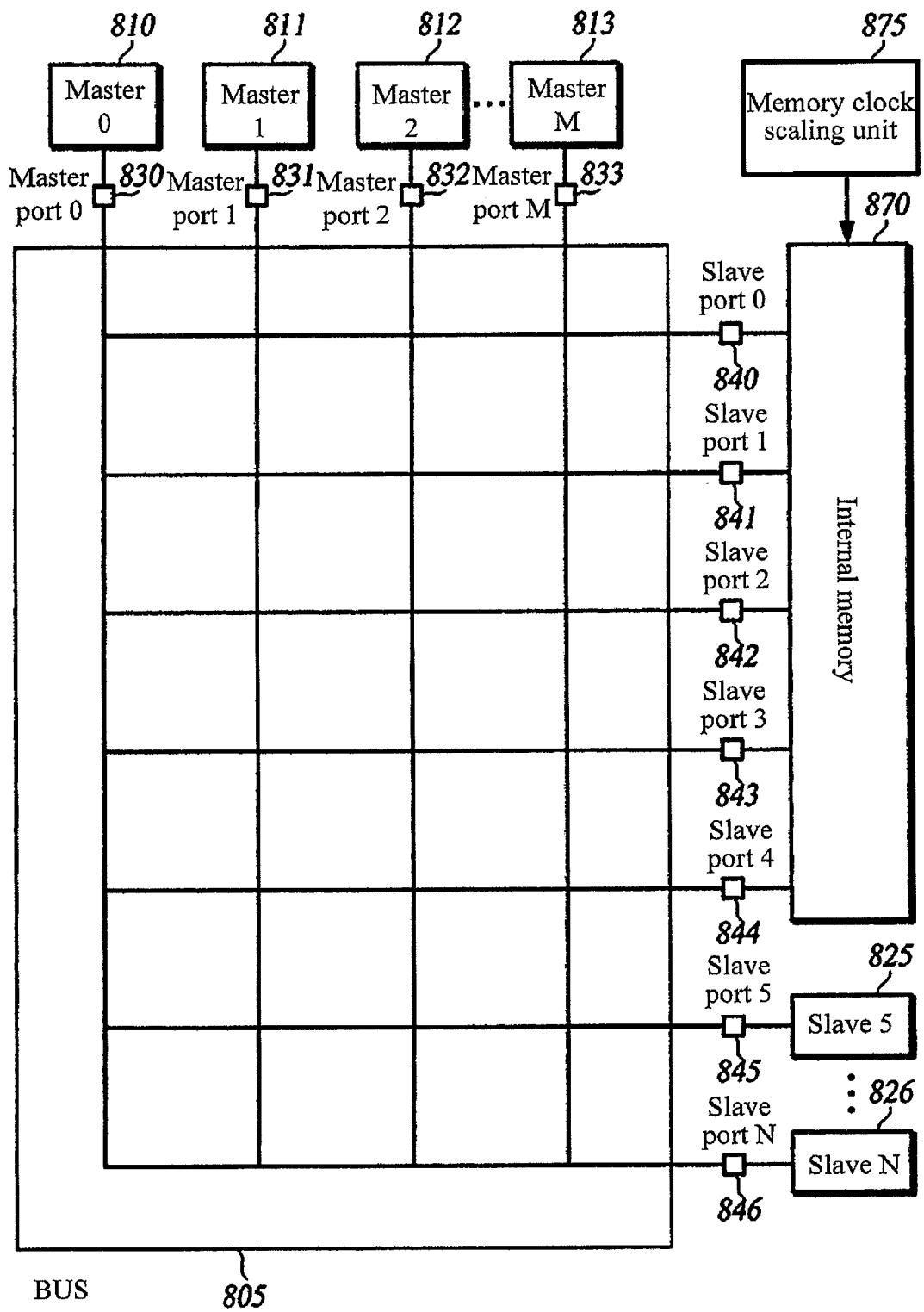
FIG. 8A is a block diagram illustrating a memory time-sharing apparatus according to another exemplary embodiment of the present disclosure.
Figure 8B:
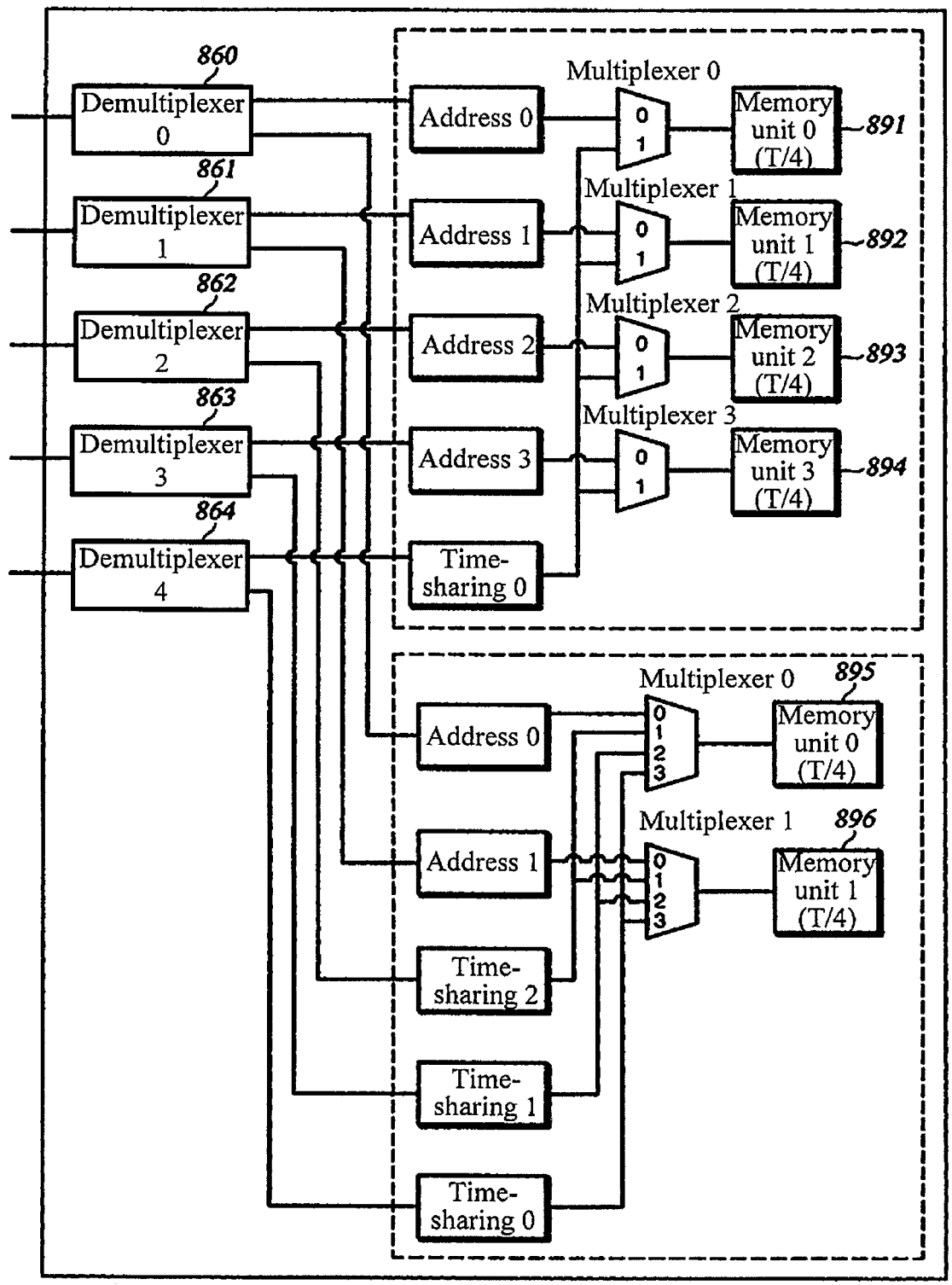
FIG. 8B is a block diagram illustrating an internal memory of a memory time-sharing apparatus according to another exemplary embodiment of the present disclosure.

With reference to FIGS. 8A and 8B, a memory time-sharing apparatus according to another exemplary embodiment of the present disclosure will be described below. FIG. 8A is a block diagram illustrating a memory time-sharing apparatus according to another exemplary embodiment of the present disclosure. FIG. 8B is a block diagram illustrating an internal memory of a memory time-sharing apparatus according to another exemplary embodiment of the present disclosure.

The memory time-sharing apparatus according to the present embodiment may include a processor-based electronic device and may be integrated into a semiconductor integrated circuit. These devices may include a set-top box, an entertainment unit, a navigation device, a communication device, personal digital assistants (PDA), a fixed position data unit, a mobile position data unit, a mobile phone, a cellular phone, a computer, a portable computer, a desk top computer, a monitor, a computer monitor, a television, a tuner, a radio, a satellite radio, a music player, a digital music player, a portable music player, a video player, a digital video player, a digital video disk (DVD) player, and a portable digital video player.

The memory time-sharing apparatus according to the present embodiment may be provided to a system-on-chip (SoC) using an application specific integrated circuit (ASIC) and/or a field programmable gate array (FPGA).

As illustrated in FIG. 8A, the memory time-sharing apparatus according to the present embodiment may include a master 0 810 to a master M 813, a slave 5 825 to a slave N 826, an internal memory 870, and a memory clock scaling unit 875. Here, each of the master 0 810 to the master M 813 or each of the slave 5 825 to the slave N 826 may be any one of a central processing unit (CPU) (not shown), an input device (not shown), an output device (not shown), a communication device (not shown), and a display device (not shown).

The internal memory 870 may be connected to a slave port 0 to a slave port 4. The internal memory 870 may include a static memory and/or a dynamic memory. The internal memory 870 may include program storage and data storage. For example, a static random access memory (SRAM), a dynamic random access memory (DRAM), a synchronous DRAM (SDRAM), a data double rate (DDR) SDRAM, a data double rate 2 (DDR2) SDRAM, a data double rate 3 (DDR3) SDRAM, a mobile DDR (MDDR) SDRAM, a low power (LP) DDR SDRAM, and an LP DDR2 SDRAM.

The memory clock scaling unit 875 may be connected to the internal memory 870 and may scale a memory clock of the internal memory 870. The memory clock scaled by the memory clock scaling unit 875 may be S (S is a natural number) times the bus clock. This is related to a plurality of slave ports connected to the internal memory 870 and, accordingly, a memory clock is scaled.

When a system needs to slowly maintain the bus clock, a memory may also be time-shared to distribute bus traffic using a method of scaling a memory clock.

Five slave ports connected to the internal memory illustrated in FIG. 8A may selectively and variably apply the memory time-sharing apparatus described with reference to FIG. 6 and the memory time-sharing apparatus described with reference to FIG. 7 as necessary.

As illustrated in FIG. 8B, the internal memory 870 may include demultiplexers 860 to 864, an address, a multiplexer, and a memory unit. The demultiplexers 860 to 864 may select one of a plurality of output lines. The internal memory 870 may be variably select and use four separate memory units 891 to 894 or two separate memory units 895 and 896 using the demultiplexers 860 to 864.

When an internal memory is used as the four memory units 891 to 894, the four memory units 891 to 894 may have a total of T bytes and each of the four memory units 891 to 894 may have T/4 bytes. When the internal memory is used as the two memory units 895 and 896, the two memory units 895 and 896 may have a total of T bytes and each of the two memory units 895 and 896 may have T/2 bytes.

Although FIG. 8A illustrates the case in which slave ports 0 to 4 are connected to an internal memory, this is merely an exemplary and, thus, the number of slave ports connected to the internal memory is not limited to 5. For example, 7 slave ports (slave ports 0 to 6) may be connected to the internal memory.

Figure 9:
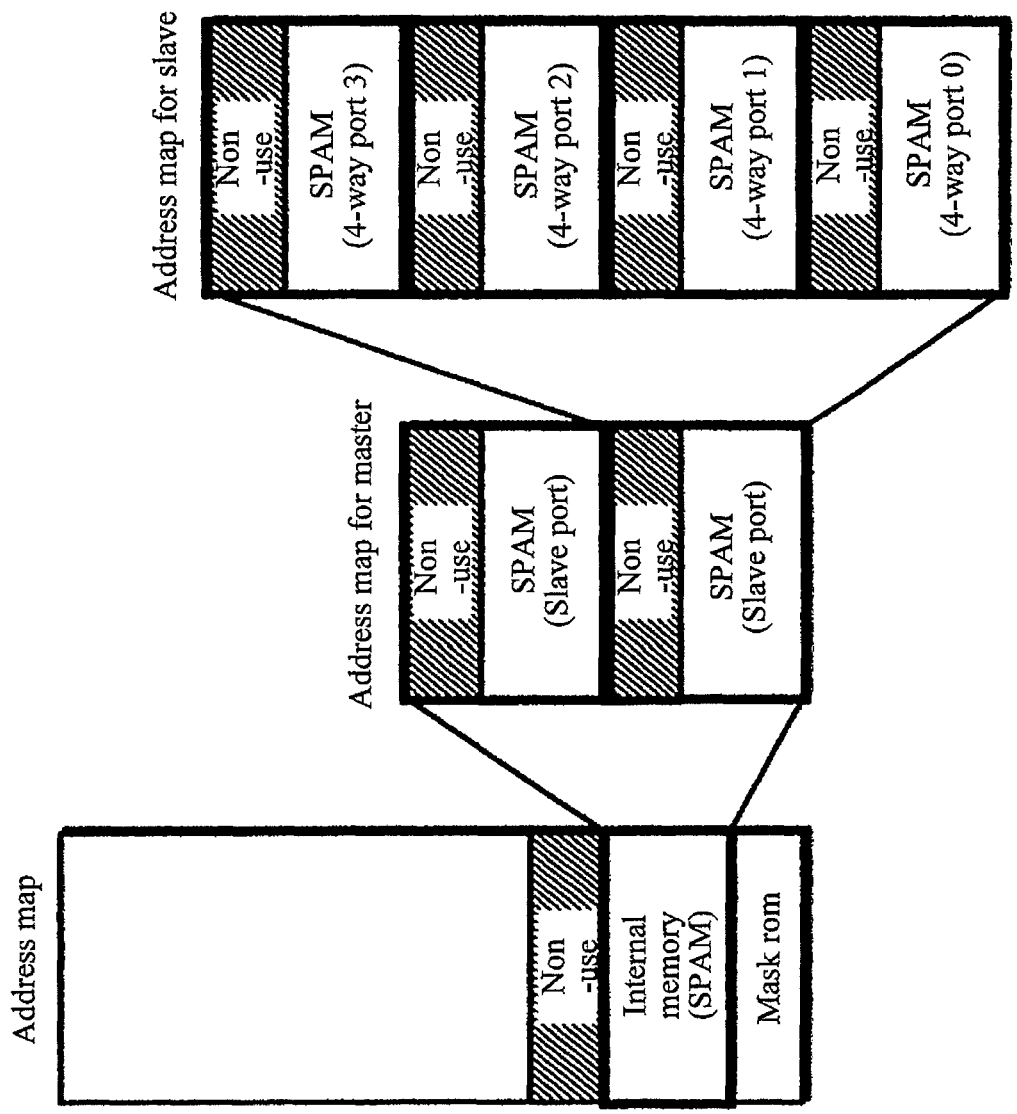
FIG. 9 is a diagram illustrating a 4-way interleaved memory address according to another exemplary embodiment of the present disclosure.
Figure 10A:
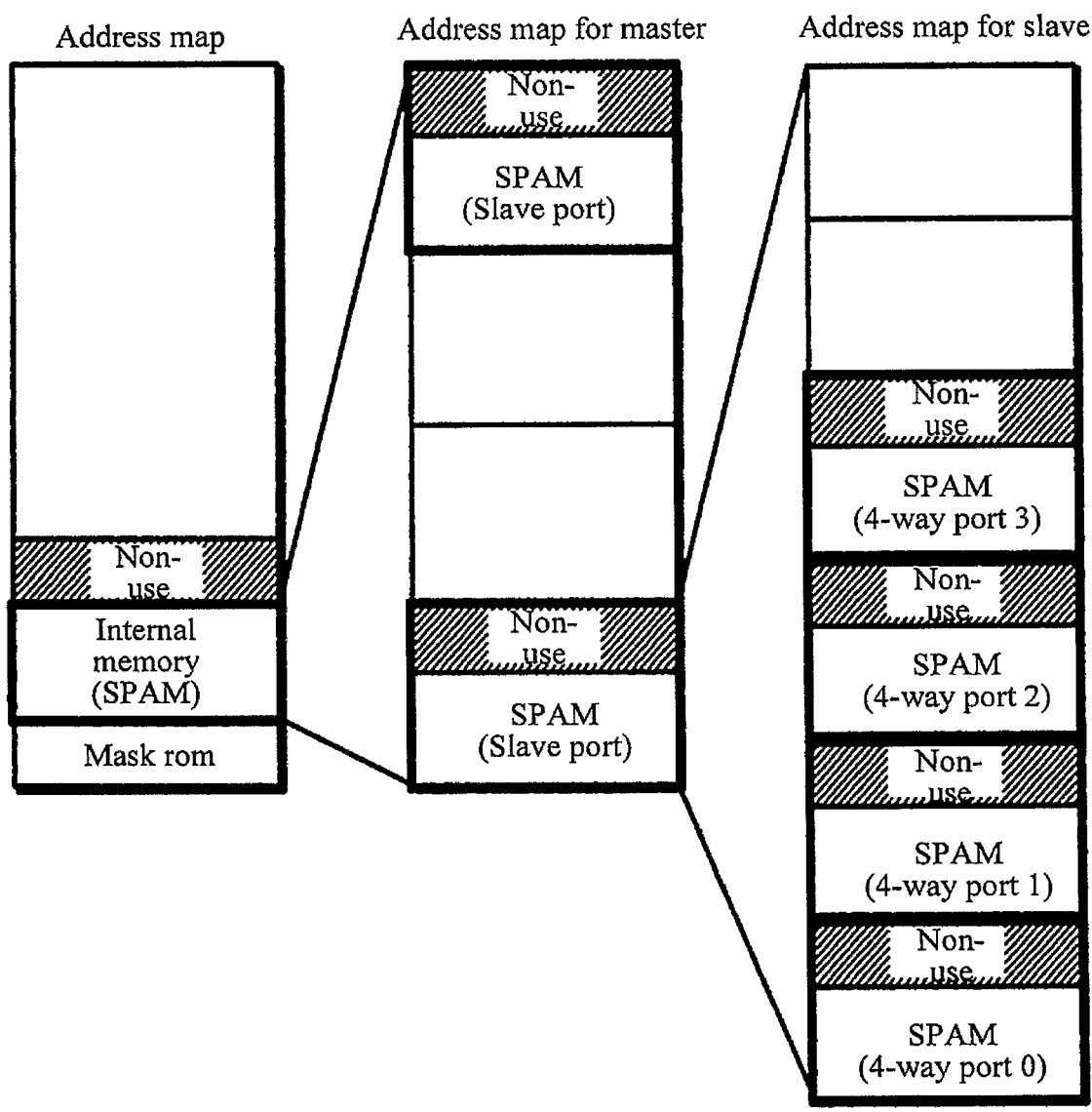
FIG. 10A is a diagram illustrating a 4-way of a 4-way/2-way interleaved memory address map according to another exemplary embodiment of the present disclosure.
Figure 10B:
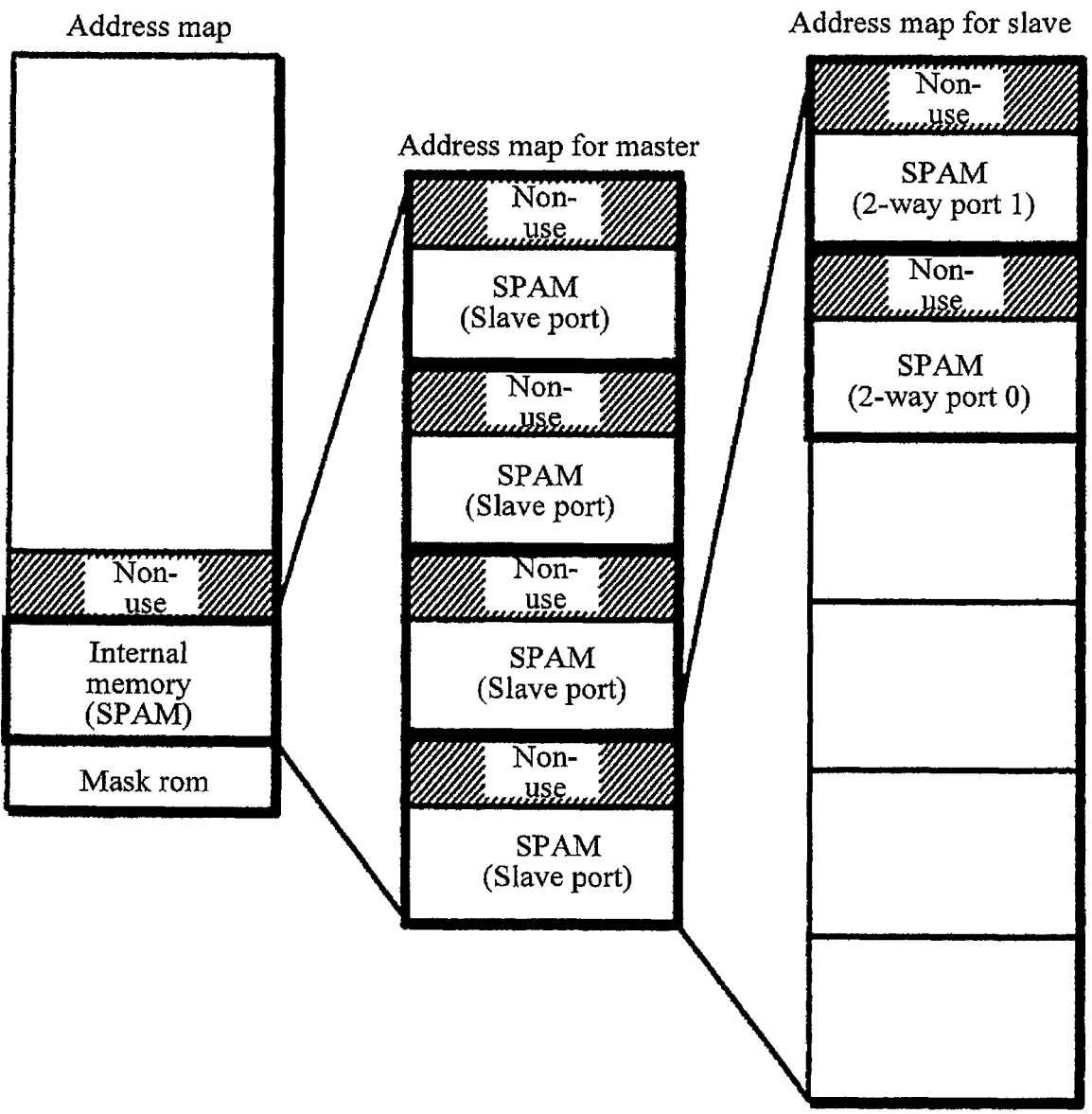
FIG. 10B is a diagram illustrating a 2-way mode of 4-way/2-way interleaved memory address map according to another exemplary embodiment of the present disclosure.

With reference to FIGS. 9, 10A, and 10B, a memory address map according to another exemplary embodiment of the present disclosure will be described below. FIG. 9 is a diagram illustrating a 4-way interleaved memory address according to another exemplary embodiment of the present disclosure. FIG. 10A is a diagram illustrating a 4-way of a 4-way/2-way interleaved memory address map according to another exemplary embodiment of the present disclosure. FIG. 10B is a diagram illustrating a 2-way mode of 4-way/ 2-way interleaved memory address map according to another exemplary embodiment of the present disclosure.

As illustrated in FIGS. 9, 10A, and 10B, the memory address map according to the present embodiment may include a plurality of address areas using some of bits included in an address. The memory address map may be allocated a memory address area to be used as a mask ROM, an internal memory, or the like.

Some of a plurality of address areas may be allocated an address area to be used as an internal memory. For example, in order to use 256 mega bytes (MB) to 0x2FFFFFFF from 0x20000000 as an internal memory, an address area may be allocated. An address area to be used as an internal memory may have an address area that points a master port and an address area that points a slave port. Here, the pointing refers to allocation of a memory space to be used from an address area of a memory in consideration of a memory size.

An address area for a slave port may point four 4-way ports and/or two 2-way ports. Accordingly, an effect of expanding a bandwidth may be achieved. An address area for a slave port and a slave port for time-sharing may be connected together to distribute bus traffic.

The memory time-sharing apparatus is configured in such a way that the five slave ports illustrated in FIGS. 8A and 8B are connected to the internal memory may variably select and use the 4-way interleaved memory address map and the 2-way interleaved memory address map.

The 4-way mode of the 4-way/2-way interleaved memory address map illustrated in FIG. 10A may correspond to the memory time-sharing apparatus described with reference to FIG. 6. In the 4-way mode of the 4-way/2-way interleaved memory address map, an address map for master may be allocated two address areas and an address map for slave may be allocated four address areas for a 4-way port. Accordingly, according to a situation of port traffic, a memory unit may be separated into four portions. An internal memory connected to five slave ports may time-share and use the memory address map in a 4-way mode.

The 2-way mode of the 4-way/2-way interleaved memory address map illustrated in FIG. 10B may correspond to the memory time-sharing apparatus described with reference to FIG. 7. In the 4-way mode of the 4-way/2-way interleaved memory address map, an address map for mater may be allocated four address areas and an address map for slave may be allocated two address areas for a 2-way port. Accordingly, according to a situation of port traffic, a memory unit may be separated into two portions. An internal memory connected to five slave ports may time-share and use the memory address map in a 2-way mode.

Figure 11:
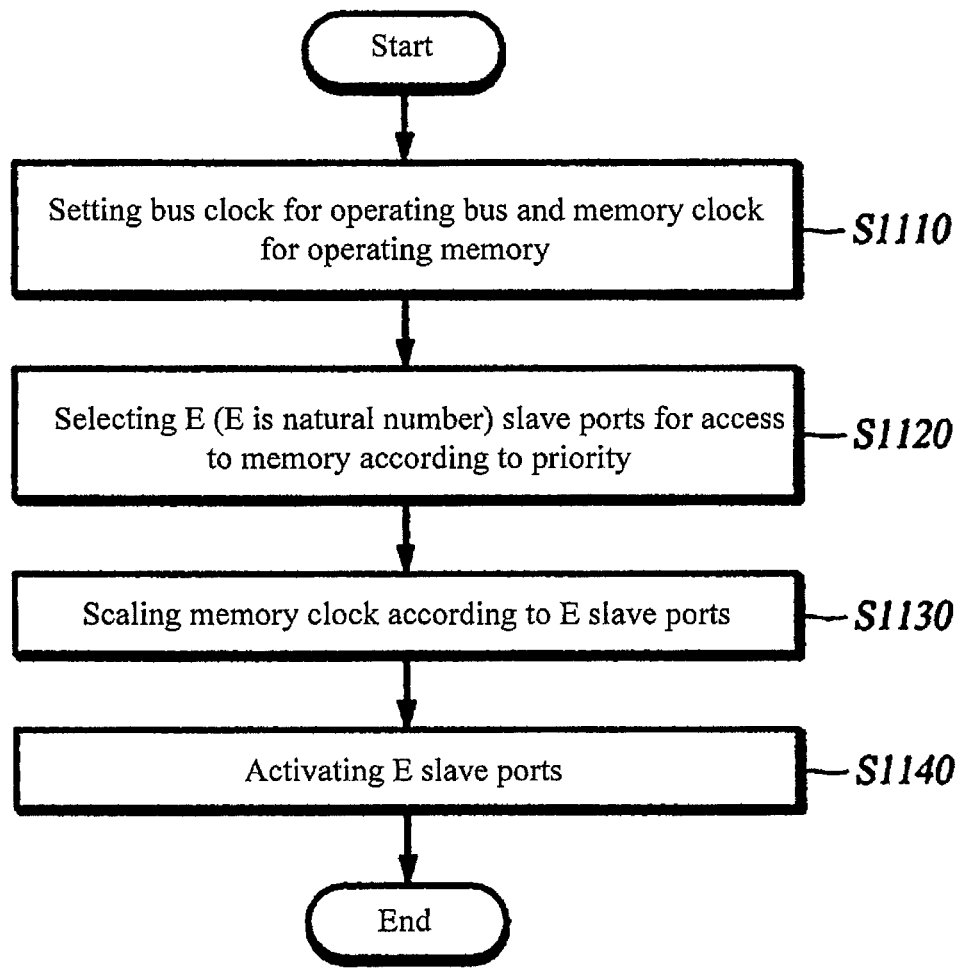
FIGS. 11 to 13 are flowcharts illustrating a memory time-sharing method according to another exemplary embodiment of the present disclosure.
Figure 12:
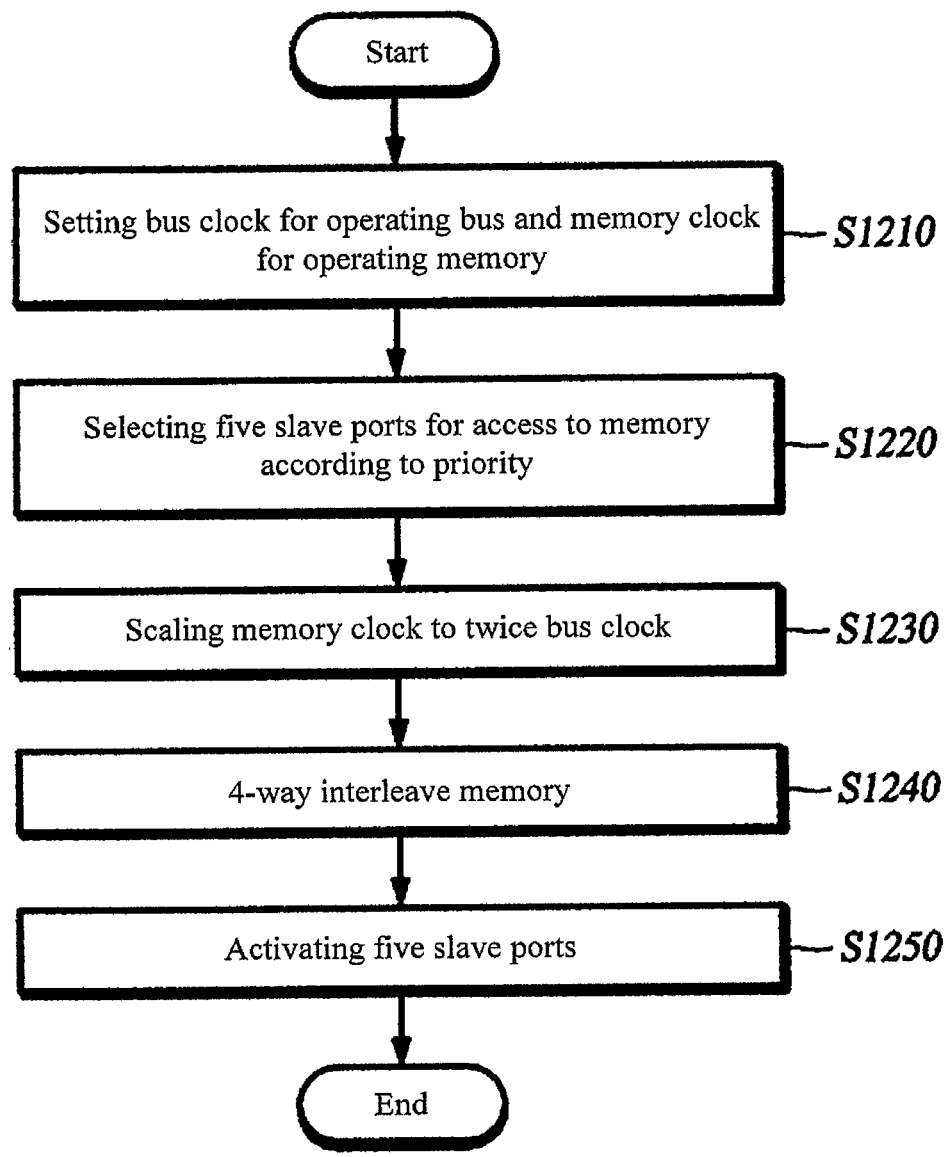
Figure 13:
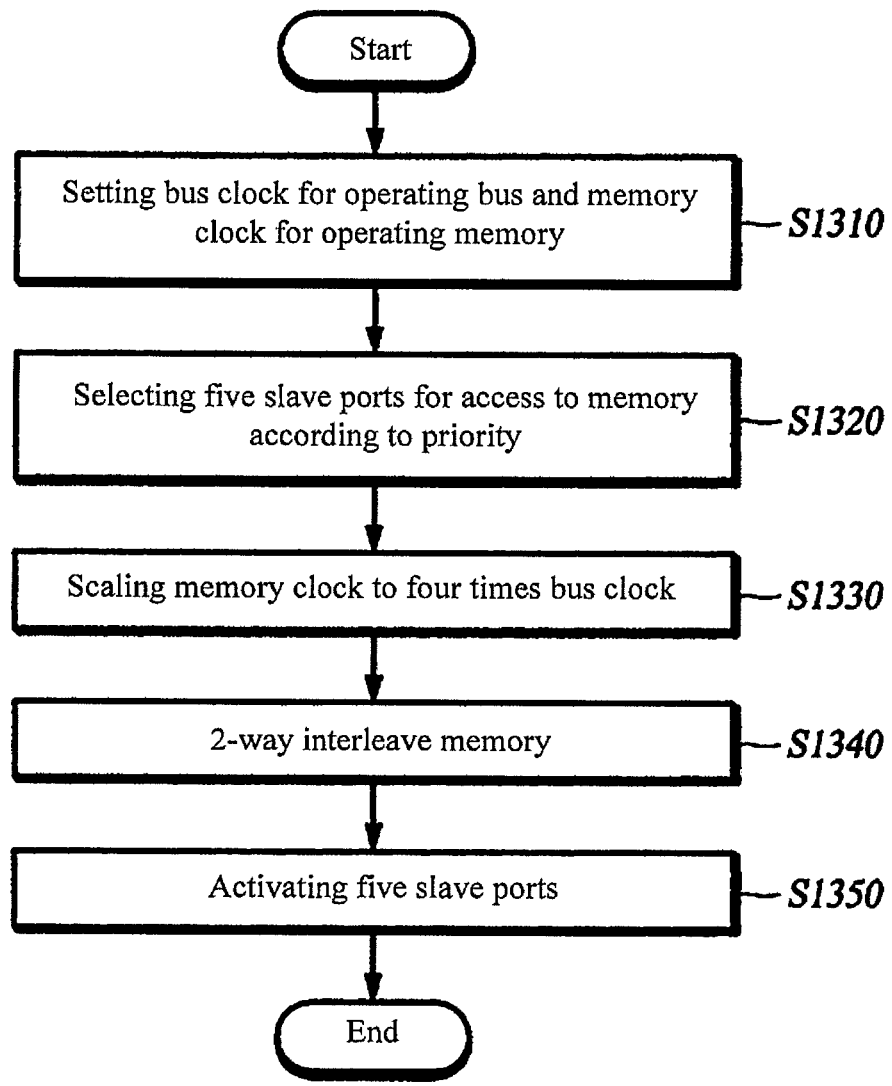

With reference to FIGS. 11 to 13, a memory time-sharing method according to another exemplary embodiment of the present disclosure will be described below. FIGS. 11 to 13 are flowcharts illustrating a memory time-sharing method according to another exemplary embodiment of the present disclosure.

A procedure of variably changing the number of slave ports for access to an internal memory in order to distribute traffic by the bus system described with reference to FIG. 3 will be exemplified below. The bus system may set a bus clock for operating a bus and a memory clock for operating a memory (S1110). The system may perform booting when the memory clock and the bus clock are aligned. In this case, one slave port for access to the internal memory is activated.

E (E is a natural number, E≤C) slave ports for access to the internal memory may be set (S1120). This is because, according to a situation of a bus, it may be necessary to adjust the number of slave ports.

The memory clock may be scaled instead of simply increasing only the number of slave ports for access to the internal memory (S1130). In other words, the memory clock may be set to a multiple of the bus clock. Accordingly, the slave port for access to the internal memory may be activated according to a multiple of the slave port. The E slave ports may be activated (S1140).

For example, the memory clock may be set to twice the bus clock and one slave port for access to the internal memory may be further activated to activate two slave ports for access to the internal memory. In addition, the memory clock may be set to three times the bus clock and the slave port for access to the internal memory may be further activated to activate three slave ports for access to the internal memory. An example in which the memory clock needs to be scaled may include the case in which an additional application is activated or the case in which overload exerted in a port is detected by a port traffic monitoring unit.

A procedure of scaling a memory clock by the 4-way interleaved memory time-sharing apparatus described with reference to FIG. 6 will be exemplified below. The memory time-sharing apparatus may set a bus clock for operating a bus and a memory clock for operating a memory (S1210). The memory time-sharing apparatus may align the memory clock and the bus clock. In this case, one slave port for access to the internal memory is activated. E (E is a natural number, E≤C) slave ports for access to the internal memory may be set. This is because, according to a situation of a bus, it may be necessary to adjust the number of slave ports.

The memory clock may be scaled instead of simply increasing only the number of slave ports for access to the internal memory. An example in which the memory clock needs to be scaled may include the case in which an additional application is activated, the case in which overload exerted in a port is detected by a port traffic monitoring unit, or the case in which direct access to a memory is needed.

According to this situation, the memory clock may be set to a multiple of the bus clock. Accordingly, a slave port for access to the internal memory may be activated according to a multiple of the slave port.

For example, the memory time-sharing apparatus may set the memory clock to twice the bus clock (S1230) and may further activate one slave port for access to the internal memory. The memory time-sharing apparatus may 4-way interleave a memory (S1240). In this case, the internal memory may be separated into four address areas and the four separate address areas and the four slave ports may be connected, respectively. A master further activates one slave port in order to access a memory but activates four slave ports that are connected to the separate address areas, respectively. The master shows two slave ports for access to a memory but, in reality, five slave ports are activated (S1250). Accordingly, an effect of expanding a bandwidth may be achieved.

A procedure of scaling a memory clock by the 4-way/2-way interleaved memory time-sharing apparatus described with reference to FIG. 8 will be exemplified below. The memory time-sharing apparatus may set a bus clock for operating a bus and a memory clock for operating a memory (S1310). The memory time-sharing apparatus may align the memory clock and the bus clock. In this case, one slave port for access to the internal memory is activated. E (E is a natural number, E≤C) slave ports for access to the internal memory may be set (S1320). This is because, according to a situation of a bus, it is necessary to adjust the number of slave ports.

The memory clock may be scaled instead of simply increasing only the number of slave ports for access to the internal memory. In other words, the memory clock may be set to a multiple of the bus clock.

An example in which the memory clock needs to be scaled may include the case in which an additional application is activated, the case in which overload exerted in a port is detected by a port traffic monitoring unit, or the case in which direct access to a memory is needed.

According to this situation, the memory clock may be set to a multiple of the bus clock. Accordingly, a slave port for access to the internal memory may be activated according to a multiple of the slave port.

For example, the memory time-sharing apparatus may set the memory clock to twice the bus clock and may further activate one slave port for access to the internal memory. The memory time-sharing apparatus may 4-way interleave a memory. In this case, the internal memory may be separated into four address areas and the four separate address areas and the four slave ports may be connected, respectively. A master further activates one slave port in order to access a memory but activates four slave ports that are connected to the separate address areas, respectively. The master shows two slave ports for access to a memory but, in reality, five slave ports are activated. Accordingly, an effect of expanding a bandwidth may be achieved.

In addition, the system may set the memory clock to four times the bus clock (S1330) and may further activate three slave ports for access to the internal memory. Here, the added slave ports are for time-sharing a memory. The memory time-sharing apparatus may 2-way interleave the memory (S1340). The internal memory may be separated into two address areas and the two separate address areas and the two slave ports are connected, respectively. The master may further one slave port for access to the memory but may activate the two slave ports that are connected to the separate address areas, respectively. The mater shows four ports for access to a memory but, in reality, five slave ports are activated (S1350). Accordingly, an effect of expanding a bandwidth may be achieved.

In addition, in reality, the five slave ports for access to the memory are activated and, thus, the state in which the memory clock is set to twice the bus clock may be changed to the state in which the memory clock is set to four times the bus clock. On the other hand, the state in which the memory clock is set to four times the bus clock may be changed to the state in which the memory clock is set to twice the bus clock. Accordingly, an effect of minimizing the bottleneck phenomenon of data for access to bus traffic, in particular, the memory may be achieved. The procedures included in the memory time-sharing apparatus according to the present embodiments are not limited thereto.

Although FIG. 11 illustrates the case in which operations S1110 to S1140 are sequentially performed, FIG. 12 illustrates the case in which operations S1210 to S1250 are sequentially performed, and FIG. 13 illustrates the case in which operations S1310 to S1350 are sequentially performed, these are merely examples of technical features according to an exemplary embodiment of the present disclosure. In other words, the present disclosure described above may be variously modified and changed by those skilled in the art to which the present disclosure pertains without departing from the scope and sprit of the present disclosure by changing orders illustrated in FIGS. 11 to 13 or performing operations illustrated in FIGS. 11 to 13, performing one or more of operations S1110 to S1140 in parallel, performing one or more of operations S1210 to S1250 in parallel, or performing one or more of operations S1310 to S1350 and, thus, FIGS. 11 to 13 are not limited to the time-series order.

The operations of the flowcharts of FIGS. 11 to 13 may be embodied as computer readable codes on a computer readable recording medium. The computer readable recording medium is any data storage device that can store data which can be thereafter read by a computer system. Examples of the computer readable recording medium include magnetic storage media (e.g., read-only memory (ROM), floppy discs, and hard disk), optical data storage devices (e.g., CD-ROMs and DVDs), and storage media such as carrier wave (e.g., transmission through the Internet). The computer readable recording medium can also be distributed over network coupled computer systems so that the computer readable code is stored and executed in a distributed fashion.

As described above, according to exemplary embodiments of the present disclosure, a system-on-chip may time-share an internal memory connected to a plurality of slave ports. In order to time-share the memory, a memory clock may be scaled. Accordingly, a plurality of slave ports may distribute bus traffic.

Unlike a method of increasing a bus clock frequency, the memory clock of the internal memory may be increased. The clock frequency is increased and, thus, total power consumption of the system may be increased. However, the bus clock frequency is not increased and, thus, an effect of minimizing power consumption may be achieved. Since the system-on-chip mainly uses a low-power processor, this method may be useful in terms of power management.

A plurality of masters may transmit data and a command to be executed by a slave through a bus. The plurality of masters may have different critical paths. Here, the critical path refers to a path corresponding to a longest time period taken for a master to transmit a command and data for permitting a slave to perform an operation. Via memory time-sharing, a time path may be reduced according to a situation in consideration of different critical paths. Accordingly, effects of minimizing circuit change and maximizing bus traffic distribution may be achieved.

When the system needs to slowly maintain the bus clock, a memory may also be time-shared to distribute bus traffic.

The memory clock may be variably scaled. Accordingly, the number of slave ports connected to the memory may be variably changed. Accordingly, without unnecessary clock scaling, minimum clock scaling may be possible.

The present disclosure described above may be variously substituted, altered, and modified by those skilled in the art to which the present disclosure pertains without departing from the scope and sprit of the present disclosure. Therefore, the present disclosure is not limited to the above-mentioned exemplary embodiments and the accompanying drawings.

What is claimed is:

1. A bus system comprising:
   a bus with M master ports and N slave ports connected thereto, where M is a natural number and N is a natural number;
   A masters connected to the M master ports, respectively, where A is a natural number;
   B slaves connected to the N slave ports, respectively, where B is a natural number;
   an internal memory controller connected to C slave ports that are selected according to predetermined priority among the N slave ports, where C is a natural number and C≤N; and
   a memory clock scaling unit connected to an internal memory comprising the internal memory controller and configured to scale a memory clock of the internal memory based on the number of slave ports connected to the internal memory controller,
   wherein the A masters command the B slaves to perform a predetermined operation, the B slaves perform an operation according to commands issued by the A masters, the bus transmits each of the commands issued by the A masters to the B slaves based on a bus clock, and the internal memory writes data based on a memory clock,
   wherein the memory clock of the internal memory is scaled to S times the bus clock by the memory clock scaling unit, where S is a natural number.

2. The bus system of claim 1, wherein the bus is configured in such a way that the M master ports as a horizontal axis and the N slave ports as a vertical axis are connected in a matrix form.

3. The bus system of claim 1, further comprising a port traffic monitoring unit connected to P mater ports that are selected according to predetermined priority among the M master ports, connected Q slave ports that are selected according to predetermined priority among the N slave ports, and configured to monitor at least one port among the M master ports and the Q slave ports, where P is a natural number, P≤M, Q is a natural number, and Q≤N.

4. The bus system of claim 3, wherein the port traffic monitoring unit monitors traffic of at least port among the P master ports and the Q slave ports using at least one of a weighting and number of command signals.

5. The bus system of claim 1, further comprising a port traffic monitoring unit connected to P mater ports that are selected according to predetermined priority among the M master ports, connected Q slave ports that are selected according to predetermined priority among the N slave ports, and configured to monitor at least one port among the M master ports and the Q slave ports, where P is a natural number, P≤M, Q is a natural number, and Q≤N
   wherein the memory clock scaling unit scales the memory clock using traffic of a port monitored by the port traffic monitoring unit.

6. The bus system of claim 1, wherein the bus is based on an advanced high performance bus (AHB) interface.

7. The bus system of claim 1, wherein the internal memory is a static random access memory (SRAM).

8. A memory time-sharing apparatus comprising:
   a bus with M master ports and N slave ports connected thereto where M is a natural number and N is a natural number;
   A masters connected to the M master ports, respectively, where A is a natural number;
   B slaves connected to the N slave ports, respectively, where B is a natural number;
   an internal memory controller connected to C slave ports that are selected according to predetermined priority among the N slave ports, where C is a natural number, and C≤N;
   a multiplexer connected to the internal memory controller;
   a memory unit connected to the multiplexer and configured to write data; and
   a memory clock scaling unit connected to an internal memory comprising the internal memory controller and configured to scale a memory clock of the internal memory based on the number of slave ports connected to the internal memory controller,
   wherein the A masters command the B slaves to perform a predetermined operation, the B slaves perform an operation according to commands issued by the A masters, the bus transmits each of the commands issued by the A masters to the B slaves based on a bus clock, the internal memory controller controls the commands issued by the A masters according to an order based on the memory clock, and the multiplexer selects one slave port according to predetermined priority among C slave ports connected to the internal memory controller using a multiplexer selection signal, the multiplexer selection signal being operated based on a selection signal clock, wherein the memory clock of the internal memory is scaled to S times the bus clock by the memory clock scaling unit, where S is a natural number.

9. The memory time-sharing apparatus of claim 8, wherein the internal memory controller comprises C separate address areas and the C address areas and the C slave ports are connected, respectively.

10. The memory time-sharing apparatus of claim 8, wherein the number of slave ports connected to the internal memory controller is 2.

11. The memory time-sharing apparatus of claim 10, wherein the selection signal clock is the same as the bus clock and the memory clock is twice the bus clock.

12. The memory time-sharing apparatus of claim 8, wherein the number of salve ports connected to the internal memory controller is 4.

13. The memory time-sharing apparatus of claim 12, wherein the selection signal clock is twice the bus clock and the memory clock is four times the bus clock.

14. A memory time-sharing apparatus comprising:
a bus with M master ports and N slave ports connected thereto where M is a natural number and N is a natural number;
A masters connected to the M master ports, respectively, where A is a natural number;
B slaves connected to the N slave ports, respectively, where B is a natural number;
an internal memory controller connected to C slave ports that are selected according to predetermined priority among the N slave ports, where C is a natural number and C≤N;
C multiplexers connected to the internal memory controller and D slave ports for time-sharing among the N slave ports, where D is a natural number and C+D≤N;
C memory units connected to the C multiplexers, respectively and to configured to write data; and
a memory clock scaling unit connected to an internal memory comprising the internal memory controller and configured to scale a memory clock of the internal memory based on the number of slave ports connected to the internal memory controller,
wherein the A masters command the B slaves to perform a predetermined operation, the B slaves perform an operation according to commands issued by the A masters, the bus transmits each of the commands issued by the A masters to the B slaves based on a bus clock, the internal memory controller controls the commands issued by the A masters according to an order based on the memory clock, and the C multiplexers select one slave port according to predetermined priority among the C slave ports connected to the internal memory controllers using each multiplexer selection signal, the multiplexer selection signal being operated based on a selection signal clock,
wherein the memory clock of the internal memory is scaled to S times the bus clock by the memory clock scaling unit, where S is a natural number.

15. The memory time-sharing apparatus of claim 14, wherein the internal memory controller comprises a plurality of separate address areas, the plurality of address areas have address areas pointing the A masters, and each of the address areas pointing the A maters has an address area pointing the C slaves.

16. The memory time-sharing apparatus of claim 14, wherein:
the internal memory controller comprises C separate address areas; and
the C address areas are connected to the C slave ports, respectively, one of the C address areas and the D slave ports for time-sharing are connected to an input of one of the C multiplexers, and outputs of the C multiplexers are connected to the C memory units, respectively.

17. The memory time-sharing apparatus of claim 16, wherein C address areas included in the internal memory controller are separated using some of bits included in an address.

18. A memory time-sharing apparatus comprising:
a bus with M master ports and N slave ports connected thereto where M is a natural number, N is a natural number, and N≥5;
A masters connected to the M master ports, respectively, where A is a natural number;
B slaves connected to the N slave ports, respectively, where B is a natural number;
an internal memory controller connected to four slave ports that are selected according to predetermined priority among the N slave ports;
four multiplexers connected to the internal memory controller and one slave port for time-sharing among the N slave ports;
four memory units connected to the four multiplexers and configured to write data; and
a memory clock scaling unit connected to an internal memory comprising the internal memory controller and configured to scale a memory clock of the internal memory based on the number of slave ports connected to the internal memory controller,
wherein the A masters command the B slaves to perform a predetermined operation, the B slaves perform an operation according to commands issued by the A masters, the bus transmits each of the commands issued by the A masters to the B slaves based on a bus clock, the internal memory controller controls the commands issued by the A masters according to an order based on the memory clock, and the four multiplexers select one slave port according to predetermined priority among the four slave ports connected to the internal memory controller using each multiplexer selection signal, the multiplexer selection signal being operated based on a selection signal clock,
wherein the memory clock of the internal memory is scaled to S times the bus clock by the memory clock scaling unit, where S is a natural number.

19. The memory time-sharing apparatus of claim 18, wherein:
the internal memory controller comprises four separate address areas; and
the four address areas are connected to the four slave ports, respectively, one of the four address areas and the one slave port for time-sharing are connected to an input of one of the four multiplexers, and outputs of the four multiplexers are connected to the four memory units, respectively.

20. The memory time-sharing apparatus of claim 19, wherein the selection signal clock is the same as the bus clock and the memory clock is twice the bus clock.

21. A memory time-sharing apparatus comprising:
a bus with M master ports and N slave ports connected thereto where M is a natural number, N is a natural number, and N≥5;
A masters connected to the M master ports, respectively, where A is a natural number;
B slaves connected to the N slave ports, respectively, where B is a natural number;
an internal memory controller connected to two slave ports that are selected according to predetermined priority among the N slave ports;
two multiplexers connected to the internal memory controller and three slave ports for time-sharing among the N slave ports;
two memory units connected to the two multiplexers, respectively, and configured to write data; and
a memory clock scaling unit connected to an internal memory comprising the internal memory controller and configured to scale a memory clock of the internal memory based on the number of slave ports connected to the internal memory controller,
wherein the A masters command the B slaves to perform a predetermined operation, the B slaves perform an operation according to commands issued by the A masters, the bus transmits each of the commands issued by the A masters to the B slaves based on a bus clock, the internal memory controller controls the commands issued by the A masters according to an order based on the memory clock, and the two multiplexers select one slave port according to predetermined priority among two slave ports connected to the internal memory controllers using each multiplexer selection signal, the multiplexer selection signal being operated based on a selection signal clock,
wherein the memory clock of the internal memory is scaled to S times the bus clock by the memory clock scaling unit, where S is a natural number.

22. The memory time-sharing apparatus of claim 21, wherein:
the internal memory controller comprises two separate address areas; and
the two address areas are connected to the two slave ports, respectively, one of the two address areas and the three slave ports for time-sharing are connected to an input of one of the two multiplexers, and outputs of the two multiplexers are connected to the two memory units, respectively.

23. The memory time-sharing apparatus of claim 22, wherein the selection signal clock is twice the bus clock and the memory clock is four times the bus clock.

24. A memory time-sharing apparatus comprising a memory address map having plurality of address areas using some of bits included in an address,
wherein some of the plurality of address areas are allocated an address area to be used as an internal memory, and the address area to be used as the internal memory has an address area pointing a master port and an address area pointing a slave port, and wherein a memory clock of the internal memory is scaled based on the number of slave ports connected to the internal memory, and wherein the memory clock of the internal memory is scaled to S times a bus clock, where S is a natural number.

25. A memory time-sharing method for distributing bus traffic by a bus system comprising a bus for connection of M master ports and N slave ports and a memory connected to C slave ports among the N slave ports, where M is a natural number, N is a natural number, C is a natural number, and C≤N, the method comprising:
setting a bus clock for operating the bus and a memory clock for operating the memory;
selecting E slave ports among the C slave ports, where E is a natural number, and E≤C;
scaling the memory clock according to the E slave ports, wherein the memory clock is scaled to S times the bus clock, where S is a natural number; and
activating the E slave ports.

* * * * *